Sept. 2, 1952        T. H. EYLES        2,609,278
ORNAMENTED OPHTHALMIC FRAME
Filed July 13, 1950
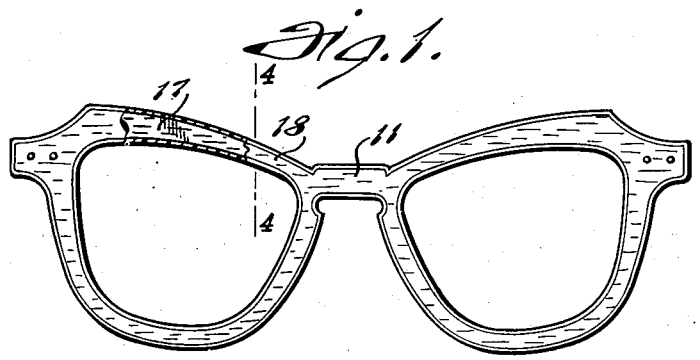
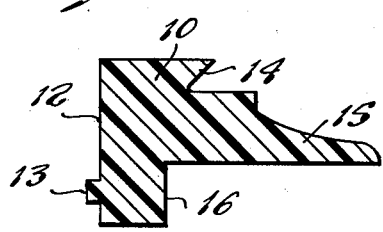
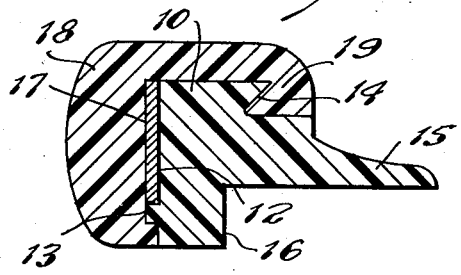
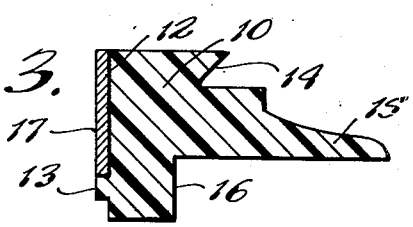
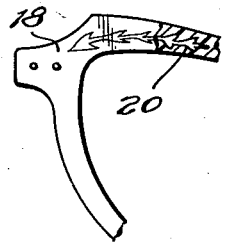
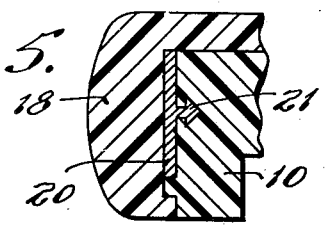
INVENTOR.
THOMAS H. EYLES
BY
Lester W. Lichtenhoefer
ATTORNEY Patented Sept. 2, 1952

2,609,278

UNITED STATES PATENT OFFICE 2,609,278

ORNAMENTED OPHTHALMIC FRAME

Thomas H. Eyles, Leominster, Mass., assignor to Foster Grant Co., Inc., Leominster, Mass., a corporation of Massachusetts Application July 13, 1950, Serial No. 173,598

2 Claims. (Cl. 41—35)

This invention relates to an ornamented ophthalmic frame, and more particularly to an ornamented sunglass frame or the like.

Ornamental optical frames are now being made from sheet stock cut to the desired form and shape. As now made they consist of two pieces of material cemented together with a piece of ornamental fabric or other ornamental matter sandwiched between the two outer laminations. This is a slow and costly procedure that does not lend itself to the manufacture of the frames on a high production basis.

The principal object of the present invention is to provide an ornamented ophthalmic frame made of molded plastic material ornamented with an ornamental insert, which frame can be inexpensively manufactured on a high production basis by injection molding or other suitable molding process.

The invention will be understood from the following description thereof, reference being had to the accompanying drawings, in which:

Fig. 1 is a face view of a frame embodying the invention, partly in section.

Fig. 2 is a sectional view, on an enlarged scale of the rear section of the frame as molded and before being united to the rear section.

Fig. 3 is a similar view of said section showing the ornamental insert cemented thereto.

Fig. 4 is a sectional view of the frame taken on the line 4—4 of Fig. 1.

Fig. 5 is a fragmentary sectional view of a modified frame having a metallic ornamental element nailed to the rear section, and:

Fig. 6 is a fragmental face view of the modified frame, partly in section.

The rear frame section 10 is made of any suitable molding plastic material, preferably by injection molding. The lens mount portions of the frame section 10 are connected by a nose bridge portion 11 and each has flat vertical front face 12 with a rectangular portion 13 projecting outward therefrom adjacent its lower end. The rear face has a substantially V-shaped indentation 14 in its upper part, a rearwardly extending tapered portion 15 preferably formed with an incurved upper face, and a lower face 16. In making a sunglass, after the frame has been completed, the lenses are laid on the faces 16 of the rear section surrounding the lens openings, and the portions 15 are rolled or bent down on the marginal edge of the lenses to bind and hold the lenses in place.

After the rear section 10 has been molded it is removed from its mold and then an insert 17 of any suitable ornamental fabric, material, or substance is cemented or fastened to the front faces 12 of the lens mount portions and across the bridge portion of the rear frame section. Instead of applying the ornamentation to the entire frame including the nose bridge, only the lens mount portions may be so ornamented. It will be understood that before the ornamental material is applied it will be cut or stamped to the required shape.

The rear frame section 10, with the ornamental material 17 attached thereto, is inserted in a second mold where the front frame section 18 is molded thereto to form a unitary structure of the two frame sections 10 and 18 with the ornamental insert disposed and permanently secured between said sections. The upper rear portion of section 18 preferably has a hook-like or hamular shaped portion 19 that is received and interfits in the indentation 14 of the rear frame section 10.

The sections 10 and 18 may be made of the same or of different plastic materials, and of the same or different colors. It is necessary, however, in order to obtain the desired ornamental effect that the front frame section 18 be made of a translucent or transparent plastic.

In the modifications illustrated in Figs. 5 and 6 the frame is ornamented with an ornamental metallic strip 20 which is fastened to the rear frame section 10 by means of prongs, nails, or pins 21. Where prongs are used they may be formed integral with the strip 20.

The manner of securing the lenses in the lens mounts by rolling or bending the extension 15 is disclosed in Patent No. 2,132,106 owned by the assignee of the present invention and is not claimed as a part of the latter.

It will be understood that modifications in the details of the construction illustrated and described may be made within the scope of the invention.

On referring to Fig. 3 it will be seen that the projection 13 of frame section 10 provides a shoulder on which the insert 17 is supported, the shoulder being of the same thickness as the insert. It will also be seen as shown in Fig. 4, that the edges of the insert, after the section 18 is molded to the section 10, are sealed in and completely enclosed by the plastic material so that the insert is fully protected from injury in use of the frame.

What I claim is:

1. An ornamented ophthalmic frame comprising a molded plastic inner frame section having an indentation in the upper part of its rear surface, a shoulder projecting outward from its front face, an ornamental element affixed to the front face of said section and resting on said shoulder, and an outer plastic frame section molded onto the inner section, said outer section having a projection that is received and interfits in the indentation of the inner frame section.

2. An ornamented ophthalmic frame comprising a molded plastic inner frame section having a substantially V-shaped indentation in the upper part of its rear surface, a shoulder projecting outward from its front face, an ornamental element affixed to the front face of said section and resting on said shoulder, and an outer plastic frame section molded onto the inner section, said outer section having a hook-like portion that is received and interfits in the indentation of the inner frame section.

THOMAS H. EYLES.

REFERENCES CITED

The following references are of record in the file of this patent:

UNITED STATES PATENTS

| Number | Name | Date |
| --- | --- | --- |
| 1,778,726 | Pappert | Oct. 21, 1930 |
| 2,127,043 | Most | Aug. 16, 1938 |
| 2,330,497 | Larmour | Sept. 28, 1943 |
| 2,342,404 | Jakeway | Feb. 22, 1944 |